United States Patent
Fassbender et al.

(10) Patent No.: US 9,322,104 B2
(45) Date of Patent: Apr. 26, 2016

(54) RECOVERING LEAD FROM A MIXED OXIDIZED MATERIAL

(71) Applicants: BASF SE, Ludwigshafen (DE); The University of British Columbia, Vancouver (CA)

(72) Inventors: Stefan Fassbender, Speyer (DE); David Dreisinger, Delta (CA); Zhenghui Wu, Vancouver (CA)

(73) Assignees: The University of British Columbia, Vancouver, British Columbia (CA); BASF SE, Ludwigshafen (DE)

( * ) Notice: Subject to any disclaimer, the term of this patent is extended or adjusted under 35 U.S.C. 154(b) by 145 days.

(21) Appl. No.: 14/076,564

(22) Filed: Nov. 11, 2013

(65) Prior Publication Data

US 2014/0131219 A1    May 15, 2014

Related U.S. Application Data

(60) Provisional application No. 61/725,824, filed on Nov. 13, 2012.

(51) Int. Cl.
*C25C 1/18* (2006.01)
*C22B 13/00* (2006.01)
*C22B 3/00* (2006.01)

(52) U.S. Cl.
CPC . *C25C 1/18* (2013.01); *C22B 13/04* (2013.01); *C22B 13/045* (2013.01)

(58) Field of Classification Search
None
See application file for complete search history.

(56) References Cited

U.S. PATENT DOCUMENTS

| | | | | |
|---|---|---|---|---|
| 1,752,356 A * | 4/1930 | Smith | ............................ | 205/599 |
| 2,525,942 A * | 10/1950 | Proell | ............................ | 205/263 |
| 3,929,597 A * | 12/1975 | Cottam et al. | .................... | 75/733 |
| 4,096,045 A * | 6/1978 | Ahonen et al. | ................. | 205/600 |
| 4,181,588 A * | 1/1980 | Wong et al. | .................... | 205/600 |
| 4,272,341 A * | 6/1981 | Lamb | ........................... | 205/603 |
| 4,944,851 A * | 7/1990 | Cordani et al. | ............... | 205/575 |
| 5,262,020 A * | 11/1993 | Masante et al. | ................ | 205/599 |
| 5,494,649 A * | 2/1996 | Fristad et al. | .................... | 423/27 |
| 5,520,794 A * | 5/1996 | Gernon | ......................... | 205/598 |
| 5,612,224 A * | 3/1997 | O'Brien | .......................... | 436/73 |
| 5,762,683 A * | 6/1998 | Jackson et al. | ................... | 75/743 |
| 5,935,409 A * | 8/1999 | King et al. | ...................... | 205/560 |
| 6,117,209 A * | 9/2000 | Adanuvor | ....................... | 75/739 |
| 6,428,676 B1 * | 8/2002 | Onuoha | .......................... | 205/478 |
| 7,368,043 B2 | 5/2008 | Mohanta et al. | | |

(Continued)

FOREIGN PATENT DOCUMENTS

JP    2012072480    4/2012
WO    WO2007099119    9/2007

OTHER PUBLICATIONS

International Search Report for PCT/IB2013/002540 dated Mar. 17, 2014 (7 pages).

*Primary Examiner* — Harry D Wilkins, III
(74) *Attorney, Agent, or Firm* — Lowenstein Sandler LLP

(57) ABSTRACT

In an example of a method for recovering lead from a mixed oxidized lead material, methane sulfonic acid is selected as a leaching acid for the mixed oxidized lead material. The mixed oxidized lead material is exposed to a solution including the methane sulfonic acid, which leaches lead from any of a lead oxide or a lead carbonate in the mixed oxidized lead material, and generates a liquid leachate including a lead-methane sulfonate salt. The liquid leachate is purified, and lead is recovered from the purified liquid leachate using electrolysis.

15 Claims, 1 Drawing Sheet

(56) References Cited

U.S. PATENT DOCUMENTS

2009/0078087 A1* 3/2009 Heidenfelder et al. ......... 75/743
2015/0050199 A1* 2/2015 Korzenski ............. C22B 13/045
423/98

* cited by examiner

RECOVERING LEAD FROM A MIXED OXIDIZED MATERIAL

CROSS-REFERENCE TO RELATED APPLICATIONS

This application claims the benefit of U.S. Provisional Application Ser. No. 61/725,824, filed Nov. 13, 2012, which is incorporated by reference herein.

BACKGROUND

Lead is used in a variety of applications, including, for example, building construction, energy storage batteries (e.g., lead-acid batteries), weaponry (e.g., bullets, shots, etc.), and alloy materials (e.g., solders, pewters, fusible alloys, etc.). With such widespread application, annual lead production has expanded to greater than four million tons of refined metal. Lead may be recovered from natural ores (e.g., in a variety of mineral forms) or from recycling processes. Some lead recovery processes involve ore mining, froth flotation (which produces a high grade lead concentrate), smelting of the lead concentrate (which produces crude lead metal), and refining of the crude lead metal. Lead recovery processes involving smelting often use high temperatures, which may generate volatile products that are difficult to control and/or contain.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to recovering lead from a mixed oxidized material. Examples of the method disclosed herein utilize methane sulfonic acid (MSA) for recovering lead from mixed oxidized lead materials, such as materials containing lead oxide (i.e., PbO), lead carbonate (i.e., cerussite or $PbCO_3$), and/or lead sulfate (e.g., anglesite or $PbSO_4$). It has been found that the use of methane sulfonic acid in the method(s) disclosed herein enables lead recovery from various mixed oxidized lead materials while advantageously avoiding high temperature smelting and the use of other acids, which may be unstable or may introduce other undesirable issues with lead recovery.

Figure 1:
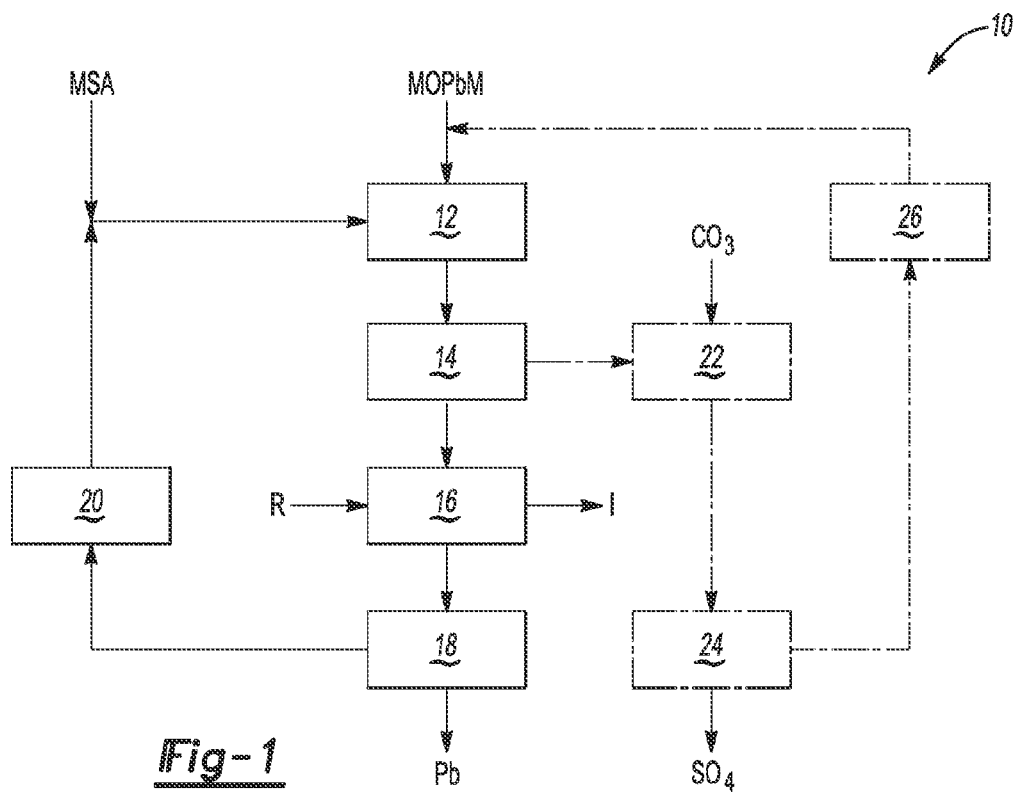
FIG. 1 is a schematic flow diagram depicting an example of a method for recovering lead from a mixed oxidized lead material.

Referring now to FIG. 1, an example of the method 10 for recovering lead from a mixed oxidized lead material is schematically depicted. In the examples disclosed herein, the mixed oxidized lead material MOPbM may be a mixed oxidized ore of lead or a mixed oxidized concentrate of lead, either of which includes one or more of lead oxide, lead carbonate, and lead sulfate. The mixed oxidized concentrate of lead may be formed from a mixed oxidized ore of lead. Prior to performing the recovery method(s) disclosed herein, the mixed oxidized lead material MOPbM may be subjected to a particle size reduction process (i.e., comminution). It is generally desirable that the particle size of the mixed oxidized lead material MOPbM range anywhere from 10 μm to about 500 μm. In an example, the reduced particle size may range anywhere from 50 μm to about 100 μm. Comminution may be accomplished by crushing, grinding, or another suitable size reduction process. The reduction in size may lead to increased reactivity of the lead material MOPbM and increased lead extraction efficiency.

At the outset of the method 10 shown in FIG. 1, methane sulfonic acid ($CH_3SO_3H$, also referred to herein as MSA) is selected as a leaching agent for the process. The selection of methane sulfonic acid is shown as "MSA" in FIG. 1. Methane sulfonic acid is a strong organic acid that is virtually free of metal ions and sulfates. It has been found that lead is highly soluble in methane sulfonic acid. For example, lead has a solubility of 143 g per 100 g of methane sulfonic acid in solution. As such, it is particularly desirable to select this acid for the lead recovery method(s) 10 disclosed herein. In addition, the lead recovery method(s) 10 utilizing MSA surprisingly involved a speedy leach extraction (e.g., from about 10 minutes to about 120 minutes) and completeness of the reaction.

In the examples disclosed herein, the methane sulfonic acid is used in an aqueous solution including from about 0.01 wt. % MSA to about 30 wt. % MSA, and a balance of water. In other examples, the aqueous solution may include water and from about 0.05 wt. % MSA to about 10 wt. % MSA, or water and from about 0.25 wt. % MSA to about 5 wt. % MSA. The aqueous solution may be made by diluting a concentrated form of the MSA with a desirable amount of water. In one example, the methane sulfonic acid is LUTROPUR® MSA or LUTROPUR® MSA 100 (both of which are commercially available from BASF Corp., located in Florham Park, N.J.), and a suitable amount of water is added to the more concentrated form of MSA to obtain the solution having the desired MSA weight percent. The solution including methane sulfonic acid may be referred to herein as the MSA solution.

At reference numeral 12 in FIG. 1, the mixed oxidized lead material MOPbM is exposed to the MSA solution. Exposure of the mixed oxidized lead material MOPbM to the MSA solution involves contacting the solid mixed oxidized lead material MOPbM with the liquid MSA solution. Solid-liquid contact may be accomplished by heap leaching, vat leaching, dump leaching, or by pulping the mixed oxidized lead material MOPbM with the MSA solution. The mixed oxidized lead material MOPbM is mixed with the MSA solution to produce a suspension. Exposure of the mixed oxidized lead material MOPbM to the MSA solution initiates acid leaching of lead from lead oxide and/or lead carbonate present in the mixed oxidized lead material MOPbM, and generates a liquid leachate.

The amount of the mixed oxidized lead material MOPbM and the amount of the MSA solution used may depend upon a target lead concentration for the liquid leachate formed during the step shown at reference numeral 12 of the method 10. In an example, the solid to liquid (i.e., MOPbM to MSA solution) ratio is selected so that the resulting liquid leachate has a lead concentration that is sufficient for performing lead electrolysis. In an example, the target lead concentration in the liquid leachate ranges from about 5 g Pb/L leachate up to saturation. As an example, the target lead concentration in the liquid leachate is 50 g Pb/L leachate. The target lead concentration may vary depending, at least in part, upon the strength of the MSA solution to be used and the temperature to be used during leaching. In order to achieve the target lead concentration, the solid to liquid ratio is selected so that the suspension of MOPbM in the MSA solution includes from about 1% solids to about 50% solids.

It is to be understood that the composition of the MSA solution may also be selected to match the target lead concentration. As an example, one molecule of MSA may be provided for each molecule of lead that is to be dissolved. It may also be desirable that excess MSA be present in order to maintain a minimum level of free acid in solution. As such, approximately 0.47 g of MSA may be used per gram of lead to be leached. In an example, if the mixed oxidized lead material MOPbM includes about 50% lead and the target concentration is 500 g of lead per liter of leachate, then the amount of MSA in the MSA solution may be about 118 g MSA/L. The amount of MSA may be calculated using the following equation: 500 g Pb/L×50% (i.e., 50/100)×0.47 g MSA/g Pb=117.5 g MSA/L.

The suspension of the mixed oxidized lead material MOPbM and MSA solution may be maintained at a predetermined temperature for a predetermined time as the liquid leachate is allowed to form. The predetermined temperature may range anywhere from about 10° C. to about 100° C. or the boiling point of water. In an example, the predetermined temperature ranges from about 10° C. to about 80° C. In another example, the predetermined temperature may range anywhere from about 20° C. to about 50° C. The temperature of the suspension may be increased to some temperature at the higher end of the given ranges in order to accelerate the rate and extent of the lead leaching. The time for maintaining the suspension may be any time that is sufficient to extract a desirable amount of the soluble lead from the mixed oxidized lead material MOPbM. In an example, the time ranges from about 10 minutes to about 120 minutes.

While the liquid leachate is forming, the suspension may also be stirred. Stirring may be accomplished using any suitable mechanism including a baffle-stirred reactor, a magnetic stirrer, etc.

The liquid leachate that is formed includes water and a lead-methane sulfonate salt that is soluble in the water. The lead-methane sulfonate salt is the product of acid leaching of the lead oxide and/or lead carbonate originally present in the mixed oxidized lead material MOPbM. Reactions that may take place during the formation of the liquid leachate include:

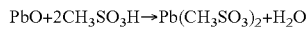
$$PbO+2CH_3SO_3H \rightarrow Pb(CH_3SO_3)_2+H_2O$$

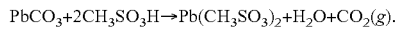
$$PbCO_3+2CH_3SO_3H \rightarrow Pb(CH_3SO_3)_2+H_2O+CO_2(g).$$

The first reaction involves the lead oxide (PbO) reacting with the methane sulfonic acid ($CH_3SO_3H$) to generate the lead-methane sulfonate salt ($Pb(CH_3SO_3)_2$) and water. The second reaction involves the lead carbonate ($PbCO_3$) reacting with the methane sulfonic acid ($CH_3SO_3H$) to generate the lead-methane sulfonate salt $Pb(CH_3SO_3)_2$, water, and carbon dioxide (in gas form).

The liquid leachate may also include a solid material, i.e., a leach solid or residue. As such, the liquid leachate may be exposed to a solid-liquid separation process (shown at reference numeral 14 of FIG. 1). Solid-liquid separation may be accomplished using thickening, filtration, centrifugation, cycloning, or another like technique in combination with washing. The solid-liquid separation results in the separation of the leach solid/residue from the liquid leachate. The use of the leach solid/residue will be discussed further hereinbelow in reference to reference numerals 22 through 26 of FIG. 1.

After solid-liquid separation, the liquid leachate may still contain impurities. As such, the step shown at reference numeral 16 of FIG. 1 involves purifying the liquid leachate. Reagent(s) R may be added to the liquid leachate in order to remove impurities I. Examples of the reagent R include pH adjusting agents or metallic lead powder or scrap.

In an example, purification of the liquid leachate is accomplished using pH adjustment, with or without aeration, to oxidize and hydrolyze impurities, such as iron, aluminum, chromium, etc. In this example, suitable pH adjusting agents include lead carbonate, sodium hydroxide, calcium oxide, calcium carbonate, magnesium oxide, magnesium carbonate, and sodium carbonate. The pH adjusting agent may be added in any amount that is sufficient to achieve a desirable pH value. For example, the pH adjusting agent may be added to the liquid leachate until the pH of the leachate is at the target value. As an example, if iron carbonate is present in the mixed oxidized lead material MOPbM prior to MSA solution leaching, iron will extract with the lead into the liquid leachate, as shown in the following reaction:

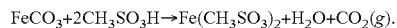
$$FeCO_3+2CH_3SO_3H \rightarrow Fe(CH_3SO_3)_2+H_2O+CO_2(g).$$

The iron can be removed by pH adjustment using an excess of lead carbonate and oxidation with air or oxygen. The removal of iron by pH adjustment is shown in the following reaction:

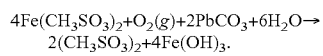
$$4Fe(CH_3SO_3)_2+O_2(g)+2PbCO_3+6H_2O \rightarrow 2(CH_3SO_3)_2+4Fe(OH)_3.$$

In another example, cementation may be used to purify the liquid leachate. During cementation, metallic lead powder or scrap is used to precipitate other noble metals, such as copper. The amount of metallic lead powder or scrap used will depend, at least in part, on the amount of impurities to be removed. In an example, the amount of metallic lead powder or scrap is proportional to the amount of impurities to be removed. As such, it may be desirable to use near stoichiometric amounts. Depending upon the metal impurity to be removed, it may also be desirable to include an excess of the metallic lead powder or scrap (i.e., an amount above the stoichiometric amount).

In still other examples, purification may also be accomplished with solvent extraction, ion exchange, or precipitation (e.g., sulfide precipitation) so as to remove the impurities I and produce a purified liquid leachate that is suitable for electrolysis.

Solvent extraction may be accomplished by mixing an organic solution containing the extractant with the aqueous liquid leachate. Mixing extracts the impurity into the organic phase. The solvent extraction reagents may vary depending upon the type of impurity to be removed. Some examples of suitable solvent extraction reagents include di-2-ethyl-hexyl-phosphoric acid and similar phosphonic or phosphinic acids, salicylaldoxime, mixtures including salicylaldoxime, VERSATIC™ acids (i.e., highly-branched carbon-rich molecules with vinyl ester, glycidyl ester, acrylate, hydroxyl and/or carboxylic functionality, from Momentive Specialty Chemicals, Gahanna, Ohio), etc. After the organic solution and the aqueous liquid leachate are mixed, the two solutions are separated, for example, by gravity settling. At this point, the organic solution is loaded with the impurity, and this solution may be exposed to stripping. The purified aqueous liquid leachate may then be used in electrolysis.

For liquid leachate purification via ion exchange, an ion exchange resin is contacted with the impure liquid leachate in a column or in a stirred reactor. Suitable ion exchange resins may include strong acid exchangers or chelating type exchangers. When precipitation is used to purify the liquid leachate, a chemical precipitant is added to the liquid leachate to precipitate the impurity as a solid particle. The solid particle impurities are removed using any suitable technique, such as filtering, thickening (e.g., gravity settling and washing), or the like. Examples of chemical precipitants that form sulfide precipitates include hydrogen sulfide gas, sodium hydrosulfide, calcium sulfide, sodium sulfide, etc.

While various examples have been given herein, it is to be understood that any suitable purification method may be used to selectively remove impurities I that are present in the liquid leachate, so long as the soluble lead-methane sulfonate salt remains in solution.

Figure 2:
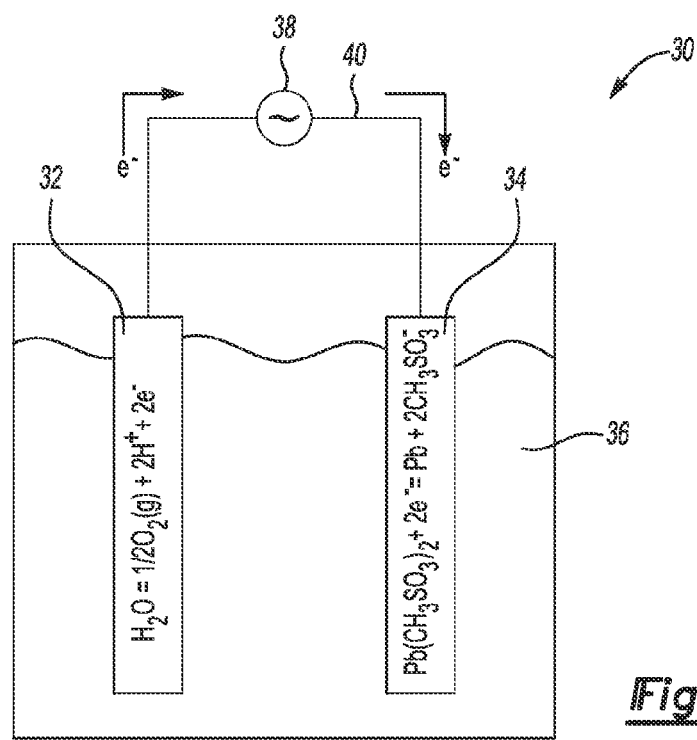
FIG. 2 is a schematic illustration of an undivided electrochemical cell for performing an electrolysis step of an example of the method for recovering lead from a mixed oxidized lead material.

The purified liquid leachate is then exposed to electrolysis in order to recover lead. This is shown at step 18 of FIG. 1. As shown in FIG. 2, electrolysis may be accomplished in an undivided electrochemical cell 30 containing an anode 32 and a cathode 34. While a single anode 32 and cathode 34 are shown, it is to be understood that a single cell 30 may include multiple anodes 32 and cathodes 34. Examples of materials suitable for the anodes 32 include graphite, titanium structures coated with precious metal oxides (i.e., DSA anodes), or any other anode material. Examples of materials suitable for the cathodes 34 include lead, stainless steel, similar recyclable materials, or any other cathode material.

The purified liquid leachate is introduced into the cell 30 and functions as an electrolyte 36.

The electrodes 32, 34 may be connected to a power supply 38 via an external circuit 40. In operation, the power supply 38 and circuit 40 allow electric current and electrons (e⁻) to flow between the electrodes 32, 34. In an example, current is supplied to the anode 32 at a current density ranging from about 100 A/m² to about 1000 A/m². The current density may be varied depending, at least in part, on the configuration of the cell 30.

When the cell 30 is operated, the power supply 38 delivers direct current (DC) to the anode 32, and electrowinning is initiated. In electrowinning, the current is passed from the anode 32 through the purified liquid leachate (i.e., the electrolyte 36) which contains the lead. It is to be understood that ionic current flows in solution. Cations are attracted to the cathode 34 and anions are attracted to the anode 32, and thus are conducted by the voltage gradient in solution between the electrodes 32, 34. The lead is extracted as it is deposited, in an electroplating process, onto the cathode 34. The overall chemical reaction in the cell 30 is:

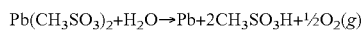

where the following reactions take place at the anode and cathode, respectively:

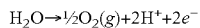

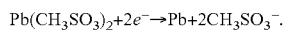

As illustrated in the chemical equations, lead is recovered as metal at the cathode 34 and oxygen is evolved at the anode 32 by electrolyzing the purified lead methane sulfonate solution (i.e., $Pb(CH_3SO_3)_2$).

Upon completion of electrolysis (and electrowinning), the electrolyte 36 (i.e., the purified liquid leachate) is depleted of lead and contains methane sulfonic acid. At this point (reference numeral 20 in FIG. 1) the lead-depleted, methane sulfonic acid-containing electrolyte 36 may be recycled and used in the MSA solution in another cycle of lead recovery. When the recycled MSA is used in another cycle of lead recovery, some amount of concentrated MSA may be added in order to generate a new MSA solution including from about 0.01 wt. % methane sulfonic acid to about 30 wt. % methane sulfonic acid.

Electrolysis (and electrowinning) may be performed for any desirable amount of time in order to extract the lead from the electrolyte 36. In an example, electroplating is allowed to take place for a period ranging from about 1 day to about 7 days. This may generate relatively thick deposits of pure lead on the cathode 34.

The temperature of the cell 30 during electrolysis may range from ambient temperature (e.g., 20° C.) to about 80° C. In an example, the temperature of the cell 30 is maintained from about 35° C. to about 45° C.

Electrochemical additives, such as animal glue, lignin sulfonates, aloes, etc. may be added to the cell 30 in order to smooth the cathode deposit and minimize contamination. The amount of any electrochemical additive added may be less than 1 g/L of solution and less than 1 kg/t (i.e., tonnes or metric tons) of metal plated.

Referring back to the step shown at reference numeral 14 in FIG. 1, after the solid-liquid separation takes place, the method 10 may further include additional steps in which the separated leach solid/residue is utilized. These additional steps may be particularly desirable when lead sulfate is present in the original mixed oxidized lead material MOPbM. The lead sulfate is not leached during acid leaching (i.e., at the step shown at reference numeral 12 in FIG. 1), at least in part, because lead sulfate is essentially insoluble in the MSA solution. In the steps of the method 10 shown at reference numerals 22 through 26, the lead sulfate may be converted to lead carbonate, which can be recycled in an MSA solution in another cycle of lead recovery.

At reference numeral 22 in FIG. 1, the separated leach solid/residue that is recovered as a result of solid-liquid separation of the liquid leachate is treated with a source of soluble carbonate (shown as $CO_3$ in FIG. 1). Examples of the source of soluble carbonate include sodium carbonate, potassium carbonate, or ammonium carbonate. During this treatment, the leach solid/residue is pulped with an aqueous solution containing the soluble carbonate source. Pulping may be performed i) with a high solids density and a sufficient amount of the soluble carbonate, and ii) for a time and at a temperature so that lead sulfate phases/minerals in the leach solid/residue are converted to lead carbonate. In an example, the ratio of carbonate in solution to sulfate in the solids is at least 1:1 on a mole:mole basis. An example of the reaction that may take place when the leach solid/residue (which contains lead sulfate, $PbSO_4$) is treated with sodium carbonate as the source of soluble carbonate is as follows:

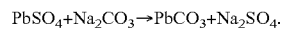

The treatment of the leach solid/residue generates a second liquid leachate which includes a second leach solid/residue. The second liquid leachate is a sulfate solution containing a lead carbonate solid (i.e., the second leach solid/residue). The second liquid leachate may be exposed to a solid-liquid separation process (shown at reference numeral 24 of FIG. 1), which may be performed using any of the techniques previously described. The solid-liquid separation results in the separation of the second leach solid/residue from the second liquid leachate.

The sulfate solution (i.e., the second liquid leachate, shown as $SO_4$ in FIG. 1) may be used in any desirable manner. In the example provided above, the sodium sulfate solution may be sold as a separate by-product or used in other processes (such as in the manufacture of detergents, or in the Kraft process of paper pulping, etc.).

At this point (i.e., at reference numeral 26 in FIG. 1), the second leach solid/residue containing lead carbonate formed from lead sulfate may be recycled. For example, the second leach solid/residue may be incorporated into an MSA solution (with or without additional mixed oxidized lead material MOPbM) in another cycle of lead recovery.

To further illustrate the present disclosure, examples are given herein. It is to be understood that these examples are provided for illustrative purposes and are not to be construed as limiting the scope of the present disclosure.

EXAMPLES

Example 1

Leaching of Lead Using MSA

A lead concentrate containing 67.12% Pb, 0.03% Zn, 1.52% Fe, 1.57% Al, 11.12% C (inorganic) and 1.5% S (total) was obtained from the Magellan Mine (Australia). X-Ray Diffraction with Rietveld Analysis was performed to identify the minerals in the concentrate. This analysis revealed that the concentrate included 67.8% cerussite ($PbCO_3$), 1% galena (PbS), 10.3% anglesite ($PbSO_4$), 7.1% susannite ($Pb_4(CO_3)_2(SO_4)(OH)_2$), 3.3% leadhillite ($Pb_4(CO_3)_2(SO_4)(OH)_2$), 8% Quartz ($SiO_2$) and 2.6% kaolinite ($AlSi_2O_5(OH)_4$).

The particle size of the lead concentrate was −150+74 microns (i.e., greater than 74 microns and less than 150 microns), and a solution having a methane sulfonic acid concentration of 0.036 mol/L was used. 2 g of the lead concentrate was added to 500 mL of the methane sulfonic acid solution in a 1 L baffled stirred reactor immersed in a water bath. The mixture was stirred at 400 rpm, and the temperature was set to 25° C. The mixture was allowed to sit under these conditions. A liquid leachate was formed, and a sample of the leachate was extracted after 30 minutes. This sample was analyzed for lead. This test revealed that after 30 minutes of leaching, 85% of the lead in the concentrate was extracted into solution.

Residue from the liquid leachate was recovered and analyzed by Rietveld X-Ray Diffraction. The residue contained 0.5% cerussite, 1.5% galena, 62.4% anglesite, 24.5% quartz, 4.8% kaolinite, and 6.3% muscovite. These results confirm that the methane sulfonic acid leaching extracted most of the available lead from the concentrate.

Example 2

Leaching of Sodium Carbonate During Lead Leaching Process

Another MSA leaching test was performed using 10 g of the lead concentrate described in Example 1, except that the particle size was −45+38 microns (i.e., greater than 38 microns and less than 45 microns). The MSA solution of Example 1 was utilized, except that 50% excess MSA was added. This leaching test was performed at 25° C. for 1 hour.

A leach residue was recovered, washed, and dried. A sodium carbonate leaching process was performed for 1 hour at 50° C. with 10:1 liquid to solid ratio and a 20% excess of sodium carbonate. A leach residue from this process was recovered, washed, and dried. The overall extraction of lead for this Example was 98.04%.

It is to be understood that the ranges provided herein include the stated range and any value or sub-range within the stated range. For example, a range from about 10 μm to about 500 μm should be interpreted to include not only the explicitly recited limits of about 10 μm to about 500 μm, but also to include individual values, such as 15 μm, 120 μm, 250 μm, 400 μm, etc., and sub-ranges, such as from about 150 μm to about 450 μm, from about 200 μm to about 300 μm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood use of the words "a" and "an" and other singular referents may include plural as well, both in the specification and claims, unless the context clearly indicates otherwise.

While several examples have been described in detail, it will be apparent to those skilled in the art that the disclosed examples may be modified. Therefore, the foregoing description is to be considered non-limiting.

What is claimed is:

1. A method for recovering lead from a mixed oxidized lead material, the method comprising:
    selecting methane sulfonic acid as a leaching acid for the mixed oxidized lead material;
    exposing the mixed oxidized lead material to a solution including the methane sulfonic acid, wherein the exposing leaches lead from any of a lead oxide or a lead carbonate in the mixed oxidized lead material and produces a liquid leachate and a first leach solid, wherein the liquid leachate includes a lead-methane sulfonate salt, and wherein the first leach solid includes lead sulfate;
    separating the first leach solid from the liquid leachate;
    treating the first leach solid with a source of soluble carbonate to produce a second leach solid including lead carbonate formed from the lead sulfate;
    purifying the liquid leachate; and
    recovering lead from the purified liquid leachate using electrolysis.

2. The method as defined in claim 1 wherein the solution is an aqueous solution including from about 0.01 wt. % methane sulfonic acid to about 30 wt. % methane sulfonic acid.

3. The method as defined in claim 2 wherein prior to exposing the mixed oxidized lead material to the aqueous solution, the method further comprises:
    identifying a target lead concentration for the liquid leachate; and
    selecting a composition of the aqueous solution to match the target lead concentration.

4. The method as defined in claim 1 further comprising:
    performing the exposing, the purifying, and the recovering with the second leach solid.

5. The method as defined in claim 4, further comprising removing a sulfate by-product from the second leach solid prior to performing the exposing, the purifying, and the recovering with the second leach solid.

6. The method as defined in claim 1, further comprising exposing the mixed oxidized lead material to a particle size reduction process prior to the exposing to generate particles of the mixed oxidized lead material having a particle size ranging from about 10 μm to about 500 μm.

7. The method as defined in claim 1 wherein the exposing of the mixed oxidized lead material to the solution including the methane sulfonic acid comprises:

pulping the mixed oxidized lead material with the solution including the methane sulfonic acid to form a suspension; and maintaining the suspension at a predetermined temperature for a predetermined time.

8. The method as defined in claim 7 wherein the predetermined temperature ranges from about 10° C. to about 100° C.

9. The method as defined in claim 1 wherein prior to the purifying, the method further comprises performing a solid-liquid separation in order to separate solids from the liquid leachate.

10. The method as defined in claim 1 wherein the purifying is accomplished by one of:
pH adjustment in combination with aeration;
cementation with metallic lead;
solvent extraction;
ion exchange; or
precipitation.

11. The method as defined in claim 1 wherein the electrolysis is accomplished by:
introducing the purified liquid leachate to an undivided electrochemical cell containing an anode and a cathode; and passing a current from the anode through the purified liquid leachate so that lead in the purified liquid leachate is electroplated onto the cathode.

12. The method as defined in claim 11 wherein a density of the current ranges from about 100 A/m$^2$ to about 1000 A/m$^2$.

13. The method as defined in claim 11 wherein a temperature of the electrolysis ranges from about 20° C. to about 80° C.

14. The method as defined in claim 11, further comprising adding an electrochemical additive to the undivided electrochemical cell.

15. The method as defined in claim 1 wherein the mixed oxidized lead material is a lead ore or a lead concentrate.

* * * * *